United States Patent [19]

Ritz

[11] 3,922,748
[45] Dec. 2, 1975

[54] REACTOR VESSEL SEAL SERVICE FIXTURE

[75] Inventor: William C. Ritz, Greensburg, Pa.

[73] Assignee: The United States of America as represented by the United States Energy Research and Development Administration, Washington, D.C.

[22] Filed: May 9, 1974

[21] Appl. No.: 468,322

[52] U.S. Cl. ............................. 15/246.5; 51/241 B
[51] Int. Cl.² ......................................... F22B 37/48
[58] Field of Search............ 15/56, 246.5; 51/241 B, 51/241 S, 241 R

[56] References Cited
UNITED STATES PATENTS

| | | | |
|---|---|---|---|
| 2,869,293 | 1/1959 | Howard............................. | 51/241 B |
| 3,448,474 | 6/1969 | Goodrum................................ | 15/56 |
| 3,817,348 | 6/1974 | Jones.................................. | 15/56 X |

Primary Examiner—Richard E. Aegerter
Assistant Examiner—Michael H. Thaler
Attorney, Agent, or Firm—John A. Horan; Leonard Belkin

[57] ABSTRACT

Apparatus for the preparation of exposed sealing surfaces along the open rim of a nuclear reactor vessel comprised of a motorized mechanism for traveling along the rim and simultaneously brushing the exposed surfaces.

6 Claims, 5 Drawing Figures

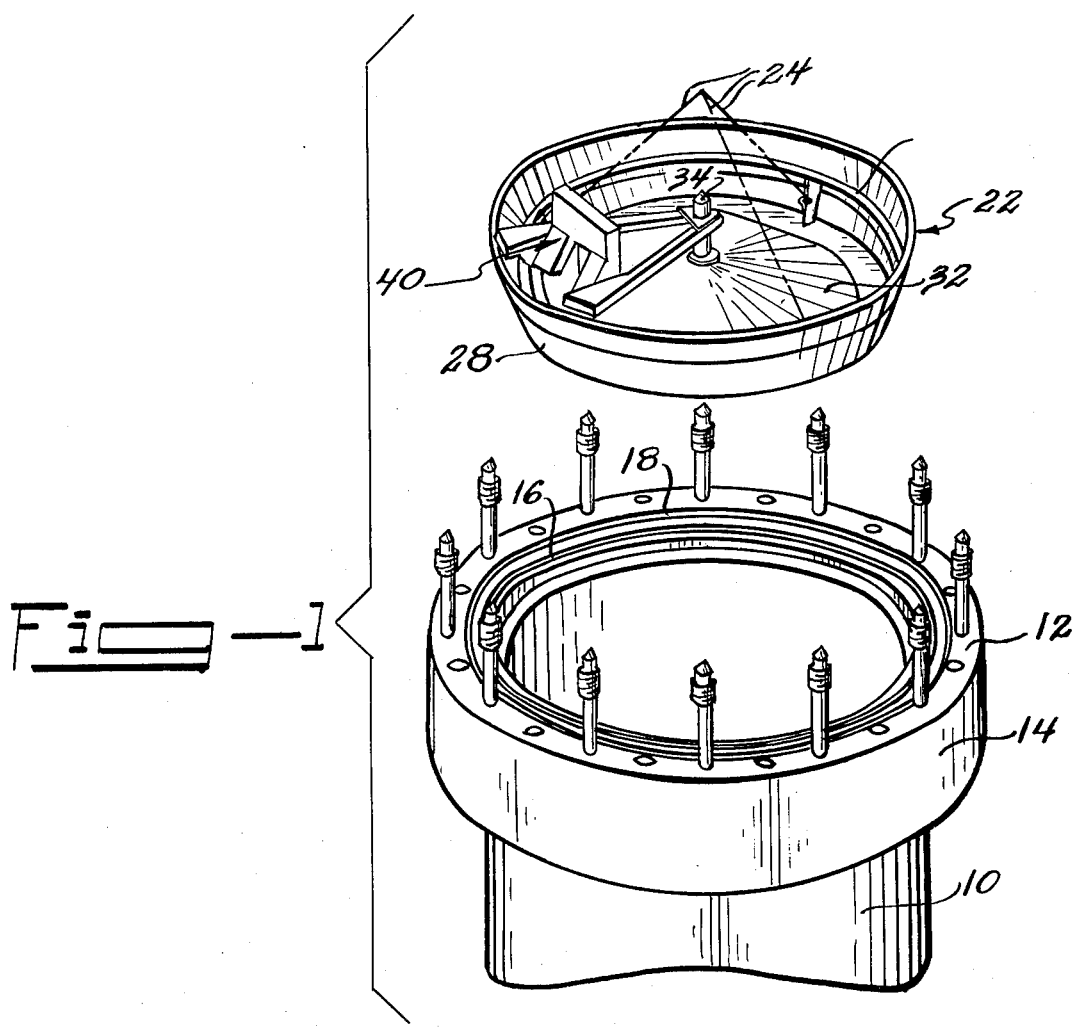

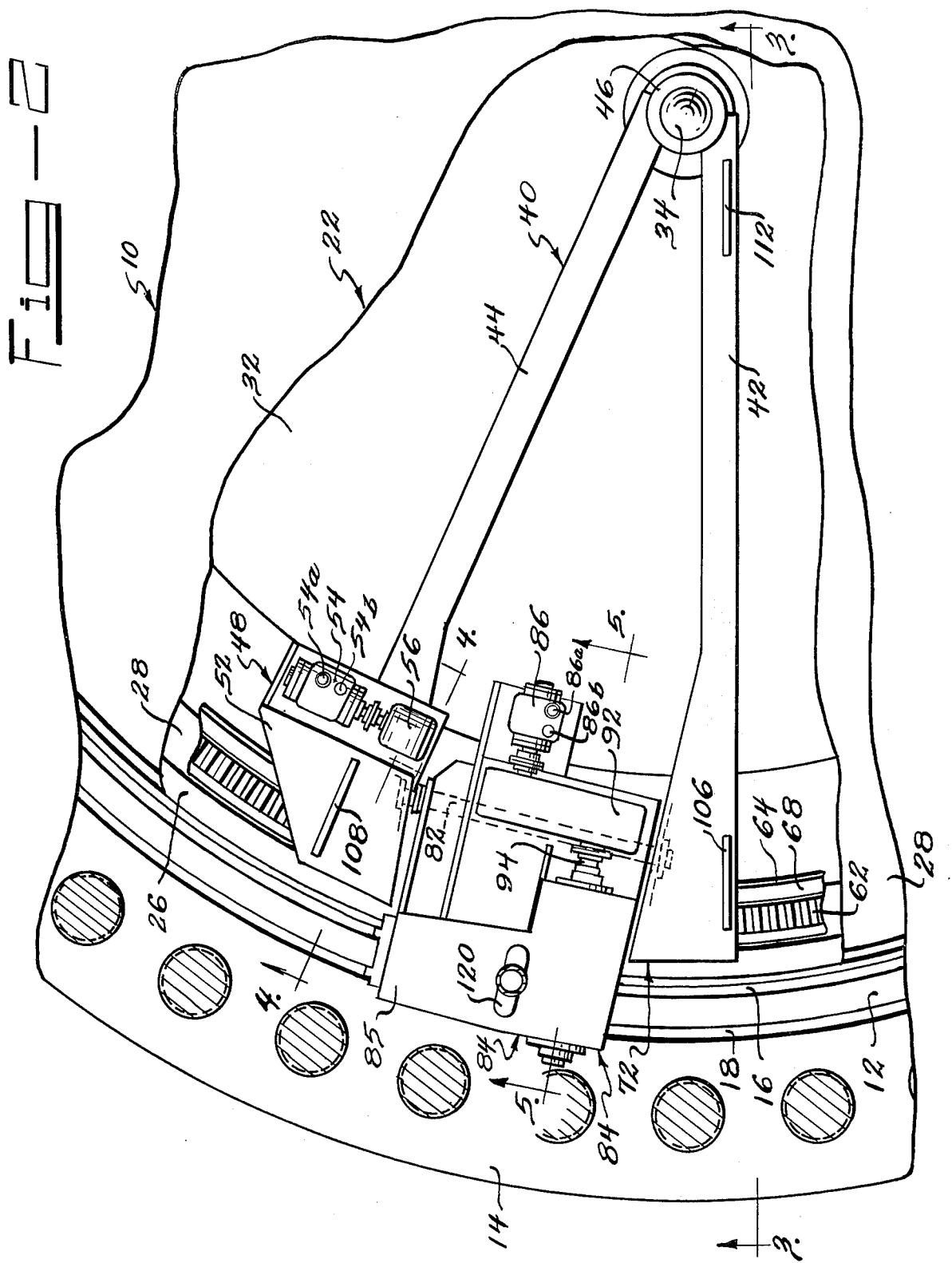

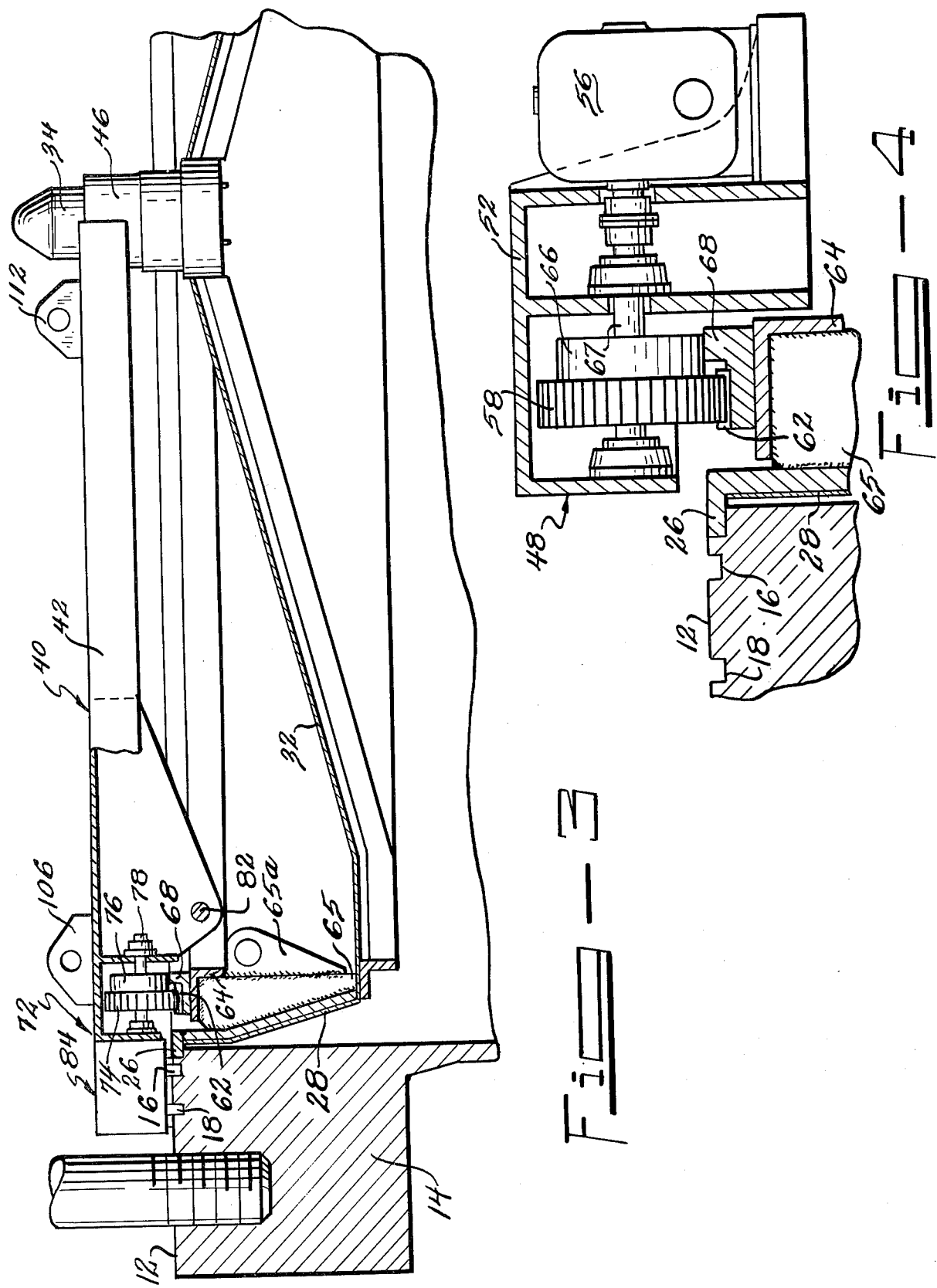

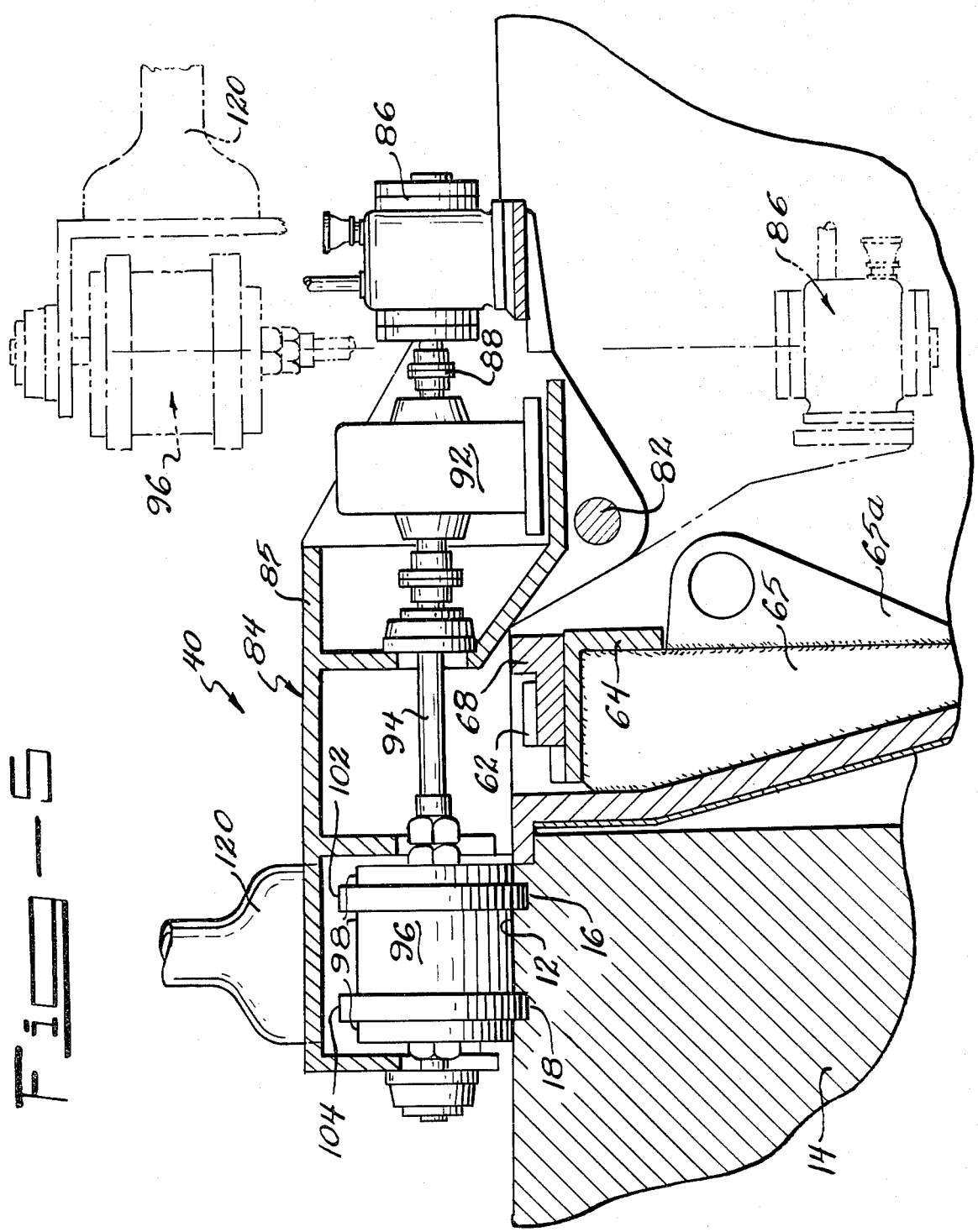

REACTOR VESSEL SEAL SERVICE FIXTURE

BACKGROUND OF THE INVENTION

The invention described herein was made in the course of, or under contract with the U.S. Atomic Energy Commission.

One proposed design for the liquid metal fast breeder (LMFBR) uses a reactor refueling scheme in which the reactor head is removed routinely. The procedure requires that the seal be replaced at each refueling operation which is conducted remotely in a hot cell where manned access is prohibited because of the radiation level from the open reactor vessel.

Before seals can be installed prior to replacement of the reactor head, the exposed surfaces which will be coated with sodium/sodium oxide must be prepared. Preparation of the surfaces involves removal of this coating.

Due to a lack of shielding, the preparation of these surfaces must be done remotely. Proposed arrangements for accomplishing this task usually involve the use of manipulators which are elaborate, expensive, and time consuming with some doubt as to their complete effectiveness.

SUMMARY OF THE PRESENT INVENTION

The present invention accomplishes the purposes described above by resorting to a relatively simple, remotely operated device which automatically removes the unwanted coating from the exposed surfaces.

In accordance with a preferred embodiment of this invention, there is provided a motorized truck for riding along the exposed rim or flange of an open reactor vessel, a member pivoted at the axis of the cylindrical reactor vessel for supporting at the outer edge thereof said motorized truck, said truck including a motor and a pinion for engaging a stationary rack to propel itself, and a motorized brush attached to the pivoted member for riding on the upper edge of the reactor vessel for rotation as it is moved along to clean the exposed surfaces and the grooves into which the seals are placed. A pan fitted into the top of the open reactor vessel supports a center post which is the pivot point for the rotating pivoted member.

This arrangement makes it possible to clean the exposed sealing surfaces effectively, efficiently, and without use of a manipulator. The pan and the cleaning assembly can be lowered into place conveniently through the use of cables.

It is thus a principal object of this invention to provide apparatus for the convenient cleaning of exposed sealing surfaces on the top of an open nuclear reactor vessel.

Other objects and advantages of this invention will hereinafter become obvious from the following description of preferred embodiments of this invention.

BRIEF DESCRIPTION OF THE DRAWINGS

FIG. 1 is an exploded isometric view of a preferred embodiment of this invention;

FIG. 2 is a top view of the preferred embodiment when employed;

FIG. 3 is a view in partial section along 3—3 of FIG. 2;

FIG. 4 is a view along 4—4 of FIG. 2;

FIG. 5 is a view along 5—5 of FIG. 2.

DESCRIPTION OF THE PREFERRED EMBODIMENTS

Referring to the figures, there is shown in FIG. 1 open reactor vessel 10 of circular cross-section ready for removal of any coatings on its exposed upper surfaces on flange 14. In the reactor shown the surfaces to be cleaned includes the upper flat surface 12 and a pair of grooves 16 and 18 to accommodate O-rings (not shown). A vessel protection pan 22, supported by cables 24, is lowered into the open end of vessel 10. As is best seen in FIG. 3, pan 22 is provided with a flange 26 supported on a shoulder in vessel 10. Pan 22 has a frusto-conical side wall 28 and a conical bottom 32 terminating in a center post 34 for a purpose to be later described.

For cleaning surface 12 and grooves 16 and 18 on flange 14 of vessel 10 there is provided an automatic cleaning assembly 40 consisting of a pair of arms 42 and 44 terminating together at one end in a hollow, cylindrical hub 46 designed to slip over post 34 as illustrated and separated at the other end by supporting structure about to be described. Arm 44 terminates at this end in a motorized propulsion unit or "truck" 48 consisting of a housing 52 carrying a gas motor 54, a gear reduction assembly 56 and a pinion 58 riding on a rack 62 supported on an L-shaped member 64 permanently mounted, as shown, on wall 28 by way of vertical supports 65, at least three of which have hook eyes 65a to receive cables 24. An idler wheel 66 on shaft 67 carrying the drive from gear assembly 56 to pinion 58 rides on a track 68 to take the support load from pinion 58. Gas motor 54 having connectors 54a and 54b for hoses not shown may be a nitrogen driven "air" motor of any type commercially available. Truck 48 typically moves along at about one-fourth RPM.

At the outer end of arm 42 is an idler support unit 72 consisting of a pinion 74 and an idler wheel 76 mounted on shaft 78. Pinion 74 rides on rack 62 while wheel 76 rides on track 68. Unit 72 is designed only to support its corner of assembly 40 as the drive for the latter is provided by assembly 48.

Pivotally supported between truck 48 and idler unit 72 on a shaft 82 supported at its ends by truck 48 and unit 72 is a powered brush assembly 84 having a housing or enclosure 85. The latter contains a nitrogen operated motor 86 similar to motor 54 connected by way of shaft 88 to reduction gearing 92 and shaft 94 to thus drive rotating wire brush 96. Connectors 86a and 86b for hoses (not shown) supply gas under pressure for the operation of motor 86. Brush 96 shaped with flat surfaces 98 and extended portions 102 and 104 is designed to fit exactly the exposed flat surface 12 and grooves 16 and 18 of flange 14 as illustrated.

Powered brush assembly 84 is shown in detail in FIG. 5 in its operating position. When rotated clockwise about shaft 82, to the position shown in phantom, the unit is in its nonoperating position. Unit 84 would be moved manually between its two positions by using a remotely operated reactor manipulator (not shown) which forms no part of this invention.

Cleaning assembly 40 would be raised and lowered by cables hooked onto three hook eyes 106, 108 and 112 shown in FIGS. 2 and 3. The weight of assembly 84 in its operating position is sufficient to insure adequate cleaning by brush 96. To carry away the dislodged particles, housing 85 is provided with ducting 120 connected to a vacuum system.

In the operation of the apparatus just described, vessel protection pan 22 is lowered into the opening of vessel 10 and is supported there in the manner illustrated in FIG. 3 and described above. The cables may be disconnected by a manipulator (not shown). Then automatic cleaning assembly 40 is lowered by cables attached to eyes 106, 108, and 112, hub 46 dropping over post 34 thereby insuring proper alignment. Brush assembly 84 which is in its not-operating position (shown in phantom in FIG. 5) is then rotated into its operating position shown in FIG. 2 by any convenient means such as a remotely operated manipulator used in handling the fuel. Motors 54 and 86 are energized and unit 40 travels around the periphery of vessel 10 while wire brush 96 rotates, cleaning the exposed surfaces. The vacuum within housing 85 maintained through duct 120 insures removal of all loosened matter. Brush 96 may be made from metallic wires or any other construction which is found to be suitable for removing the scale present.

After cleaning is complete, cables are employed to remove unit 40 and pan 28. The cables may be attached and released by the use of manipulators.

It is thus seen that there has been provided a simple yet effective means of preparing the exposed surfaces of a reactor vessel for seals and the head. It should also be noted that automatic cleaning assembly 40 can be used in conjunction with suitable seal installation apparatus, such as that shown in U.S. application Ser. No. 468,323 filed on May 9, 1974, now U.S. Pat. No. 3,872,565, having A.E.C. Docket No. S-42,867.

What is claimed is:

1. Apparatus for the removal of a surface coating on a circularly arranged surface located in the upper edge of an open cylindrical vessel comprising:
   a. stationary pan means having a frustoconical side wall adapted to be supported on a vessel;
   b. truck means for riding on the top edge of said side wall;
   c. means pivoted on the center axis of said pan for guiding said truck means in its circular movement along the top edge of said side wall;
   d. said truck means including means to propel itself and said pivoted means; and
   e. means including cleaning means supported by said pivoted means, said cleaning means being adapted for riding on the upper edge surface of a cylindrical vessel for cleaning a cylindrical surface as said truck means rotates along said side wall top surface about said axis.

2. The apparatus of claim 1 in which the cleaning means includes rotating brush means and motor means to energize said brush means.

3. The apparatus of claim 2 in which said truck means includes a pinion, and said stationary pan means includes a rack on which said pinion rides to propel said truck means.

4. The apparatus of claim 3 in which said pivoted means includes a pair of arms extending radially from said center axis and spaced at the outer ends thereof, said truck means being located at the extremity of one of said arms and having an idler pinion at the extremity of the other arm.

5. The apparatus of claim 4 in which said cleaning means is retractable.

6. The apparatus of claim 5 in which said vessel is a nuclear reactor vessel.

* * * * *